UNITED STATES PATENT OFFICE.

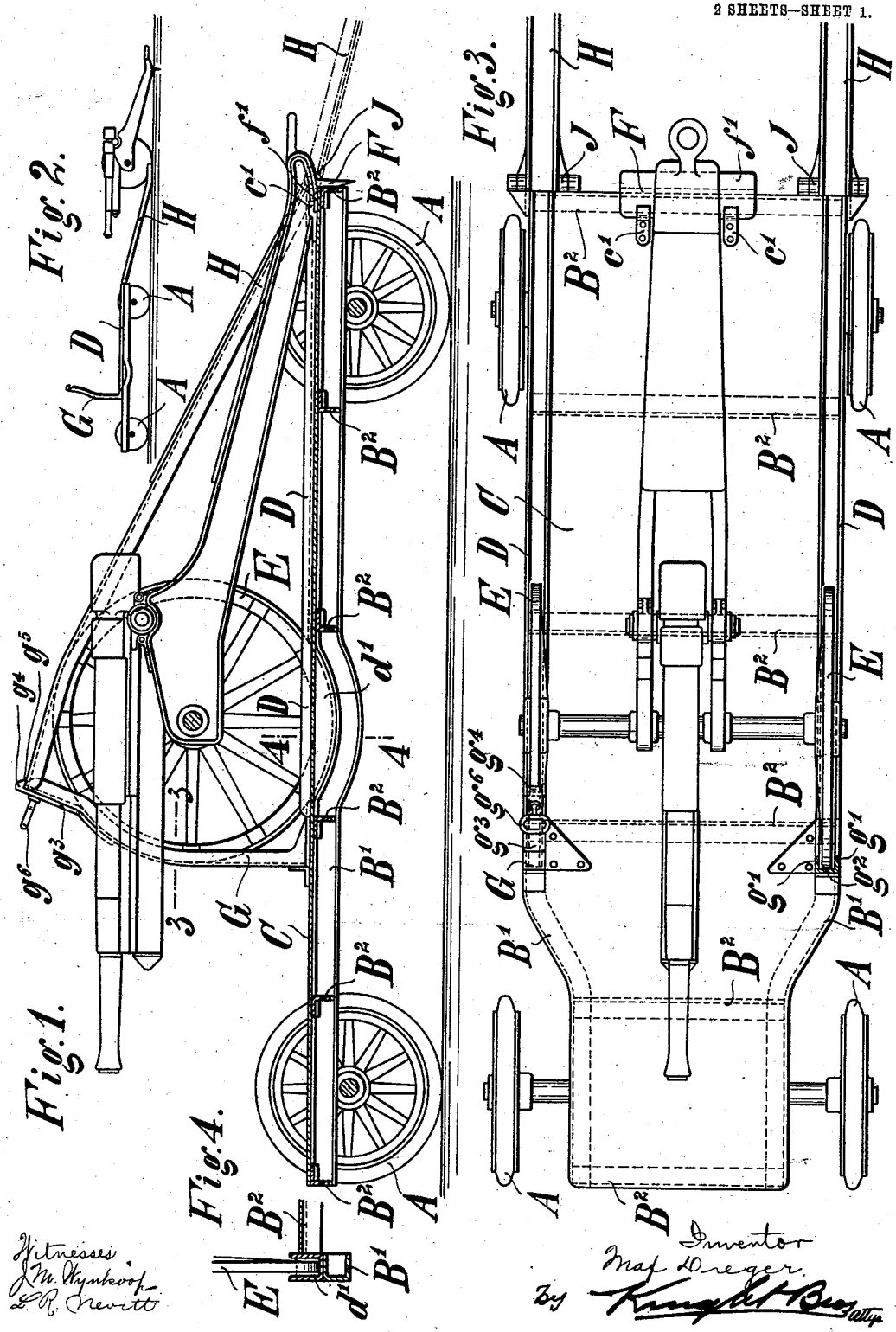

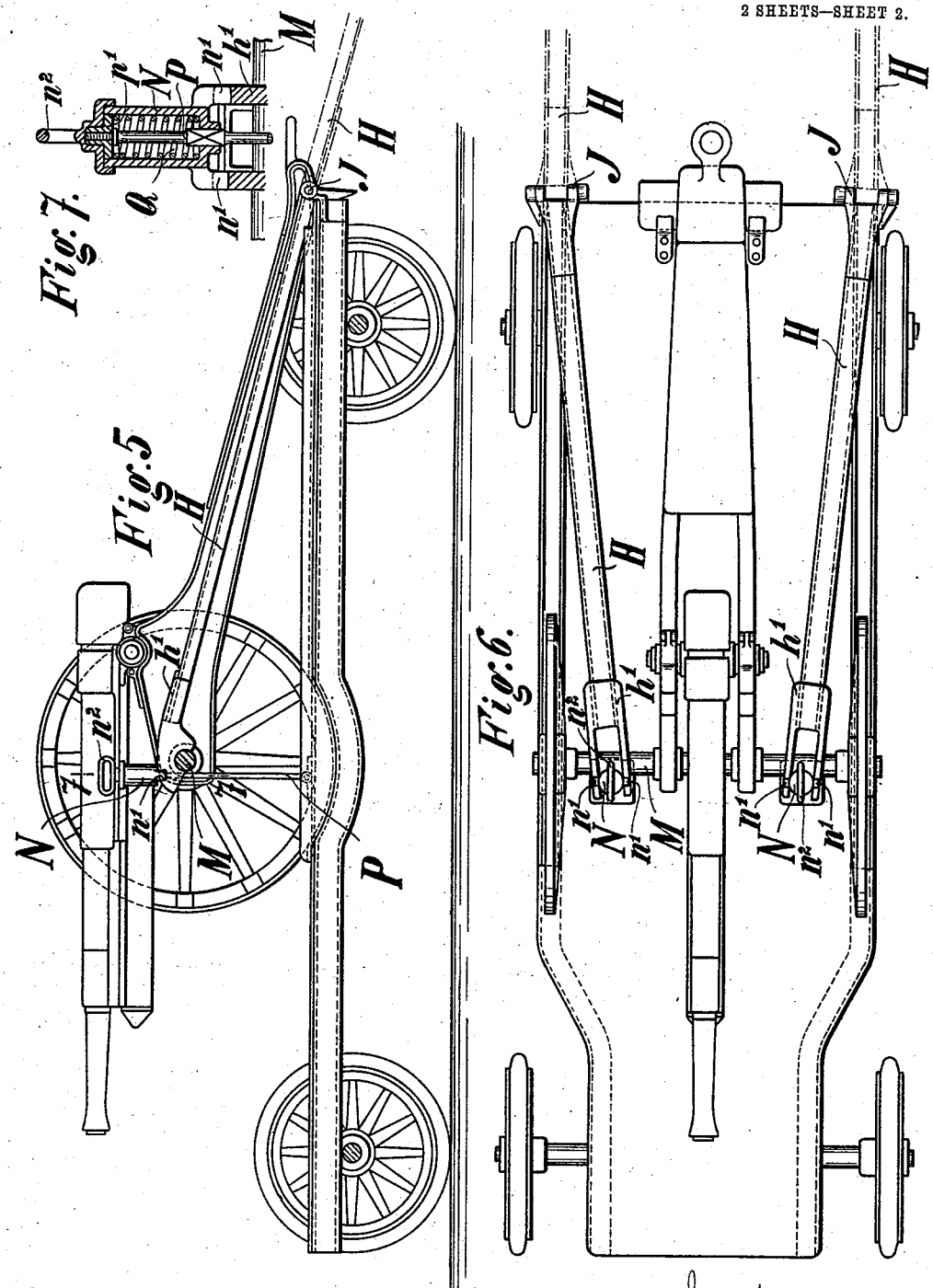

MAX DREGER, OF ESSEN-ON-THE-RUHR, GERMANY, ASSIGNOR TO FRIED. KRUPP AKTIENGESELLSCHAFT, OF ESSEN-ON-THE-RUHR, GERMANY.

VEHICLE FOR RECEIVING A PORTABLE GUN.

No. 911,810.  Specification of Letters Patent.  Patented Feb. 9, 1909.

Application filed July 23, 1908. Serial No. 444,990.

*To all whom it may concern:*

Be it known that I, MAX DREGER, a subject of the Emperor of Germany, and a resident of Essen-on-the-Ruhr, Germany, have invented certain new and useful Improvements in Vehicles for Receiving a Portable Gun, of which the following is a specification.

The present invention relates to vehicles which are adapted to receive portable guns.

It is in some instances preferable to place a portable gun on a rapidly moving vehicle, such as an automobile, and transport the gun thereon for the purpose of permitting the portable gun to keep up with a very rapidly moving target, such as an air-ship.

The object of the present invention is to provide a vehicle which is adapted to receive a portable gun and which permits of the gun being rapidly run on and off the vehicle and permits of the gun being rapidly secured in position on the vehicle. This object is attained by having carriers hinged to the vehicle, which carriers in one position can form a ramp for running the gun on the vehicle and in another position can serve for securing the gun in position on the vehicle.

The accompanying drawings show two embodiments of the invention, by way of example.

Figure 1 is a longitudinal section through one embodiment of the vehicle with a portable gun mounted thereon; Fig. 2 is a diagrammatic view of the vehicle and the gun; Fig. 3 is a top view of Fig. 1, the position of some of the parts being changed and a detail being shown in section on line 3—3, Fig. 1; Fig. 4 is a section on line 4—4, Fig. 1; Fig. 5 is a side view of the other embodiment with the gun placed thereon; Fig. 6 is a top view of Fig. 5, and Fig. 7 is a section on an enlarged scale on line 7—7, Fig. 5.

Reference will first be had to the embodiment shown in Figs. 1 to 4. The vehicle is assumed to be an automobile and the drawings show only those parts of the vehicle which are necessary for understanding the invention. The frame of the vehicle which is carried by four wheels A consists mainly of two longitudinal sills $B^1$ and a number of transverse sills $B^2$ and carries a platform C. On each of the longitudinal sides of the frame of the vehicle is secured a pressed sheet-metal rail D which is of ⊔-shaped cross-section. The two rails D are arranged in such a manner that they form a track for the carriage-wheels E of the gun to be transported. At one end the rails D have a recess $d^1$ (Figs. 1 and 4) which conforms to the shape of the wheels E. As shown in Fig. 1, the arrangement of the rails is selected in such a manner that the carriage-wheels E rest in the recesses $d^1$ of the rails D when the gun rests with its trail on the rear part of the platform C and the spade F abuts against the rearmost transverse sill $B^2$. On the platform C are secured two pressed sheet-metal posts G which are also of ⊔-shaped cross-section. The posts G are arranged in such a manner that, when the wheels E rest in the recesses $d^1$ in the rails D, the arms $g^1$ (Fig. 2) of the posts embrace the felly of the wheels and the bottom wall $g^2$ of the posts contacts with the treading surface of the wheels. Two carriers H, which are of ⊔-shaped cross-section and which are spaced apart a distance corresponding to the gage of the wheels E, are secured to the rear end of the vehicle-frame through the medium of hinges J. By turning the carriers H about the axis of the hinges J the carriers can, on the one hand, be brought into the position shown in dotted lines in Fig. 1 and, on the other hand, be brought into the position shown in full lines in the same figure. In the first-named position, which is also shown in Figs. 2 and 3, the carriers H rest with their free ends on the ground and thus form a ramp on which the gun can be run up on the platform C, and the arrangement is selected in such a manner that the carriers H in this position form a continuation of the track formed by the rails D. In the position shown in full lines in Fig. 1 the carriers H rest on the carriage-wheels E resting in the recesses $d^1$ in the rails D. In this position the carriers H are locked to the posts G in the manner shown in Fig. 1 through the medium of springy hooks $g^3$ which have their lower end secured to the posts G. The heads $g^4$ of the hooks $g^3$ have an inclined face $g^5$ (Fig. 1) which causes the heads $g^4$ to yield to the free end of the carriers H when the carriers are folded up on the carriage-wheels E. The hooks $g^3$ are furthermore provided with handles $g^6$ through the medium of which the hooks can be brought out of engagement with the free end of the carriers H. On the rear end of the platform are secured two claws $c^1$ which are adapted to overlap the press-plate $f^1$ of the spade F when the gun rests on the vehicle.

The gun is loaded on the vehicle in the following manner: After the carriers H have been brought into the position in which their free end rests on the ground (Fig. 2) the gun is run up on the ramp formed by the carriers H and on the platform C. Thereupon the gun is shoved forwardly on the rails D until the carriage-wheels E abut against the posts G. The wheels E then rest in the recesses $d^1$ in the rails D; the trail rests on the rear part of the platform C; the spade F abuts against the rearmost transverse sill $B^2$ and the claws $c^1$ engage over the press-plate $f^1$ of the spade F. Finally the carriers are swung up on the carriage-wheels. When the carriers hit the inclined faces $q^5$ on the hook-heads $q^4$ the hooks first yield to the carriers and as soon as the carriers have reached their end-position the hooks again snap back into the locking position. It is apparent that the gun is then secured against any movement on the vehicle. When it is desired to unload the gun from the vehicle the operator takes hold of the handles $q^6$ of the hooks $q^3$ and pulls the hooks backwards to such an extent that they pass out of engagement with the carriers H. The carriers are thereupon folded into the position shown in dotted lines in Fig. 1 and the gun is run down from the platform C. During this movement of the gun the carriage-wheels E are first guided by the rails D and subsequently roll downwards on the ramp formed by the carriers H.

In the embodiment shown in Figs. 5 to 7 the posts G are done away with. In this embodiment the axes of rotation of the hinges J (see especially Fig. 6) are inclined to the longitudinal direction of the vehicle and the carriers H in such a manner that the carriers H converge towards the front of the vehicle, in the position shown in full lines in the drawings, the carriers converging to such an extent that they can rest on the wheel-axle M of the gun placed on the vehicle. However, the carriers H extend parallel to each other in the position shown in dotted lines in which position the carriers form a ramp. On its free end each of the carriers H is provided with a shoe $h^1$ which has a recess conforming to the cross-section of the axle M. When the carriers H rest on the axle M the axle projects into the recess of the shoes $h^1$. Each of the carriers H can be secured in this position through the medium of a pair of claws $n^1$ which are arranged on the outer wall of a sleeve N and which are adapted to engage in corresponding notches in the shoe $h^1$. Each of the sleeves N is slidably but non-rotatably mounted on a rod P which is hinged to the platform C and each sleeve contains a helical spring Q (Fig. 7) which has one end abutting against the bottom wall of the sleeve and has its other end abutting against a disk $p^1$ secured on the end of the rod P. The sleeves N are provided with handles $n^2$ through the medium of which the claws can be withdrawn from the notches of the shoes $h^1$ against the action of the springs Q. When the several parts assume the position shown in the drawings the gun is secured in position on the vehicle.

How the gun is loaded on and unloaded from the vehicle will be apparent from the foregoing description.

Having thus described the invention, what is claimed and desired to be secured by Letters Patent is:

1. A vehicle for portable guns comprising means connected thereto and adapted to be swung from a position in which it forms a ramp for running the gun up on the vehicle to a position in which it secures the gun in position on the vehicle and means for locking said former means in its gun-securing position.

2. A vehicle for wheeled guns having means connected thereto and adapted to be swung from a position in which it forms a ramp for running the gun up on the vehicle to a position in which it engages the wheels of the gun and secures the gun in position on the vehicle and means for locking said former means in its wheel-engaging position.

3. In a vehicle for portable guns, the combination with the frame, of carriers having one end swingingly connected to the frame and having a free end adapted to rest on the ground to form a ramp for running the gun up on the vehicle and means whereby the gun may be locked upon the vehicle by means of said carriers.

4. In a vehicle for portable guns, the combination with the frame, of carriers having one end swingingly connected to the frame and having a free end adapted to rest on the ground to form a ramp for running the gun up on the vehicle; said carriers having their free ends adapted to be swung to a position in which they engage the gun to secure the gun in position on the vehicle and means for locking the carriers in their gun-securing position.

5. In a vehicle for wheeled guns, the combination with the frame, of posts mounted on the frame, carriers having one end swingingly connected to the frame and having a free end adapted to rest on the ground to form a ramp for running the gun up on the vehicle; said carriers having their free ends adapted to be swung to a position in which they engage the gun to secure the gun in position on the vehicle, and means for locking the free end of the carriers to said posts.

6. In a vehicle for wheeled guns, the combination with the frame, of carriers having one end swingingly connected to the frame and having a free end adapted to rest on the ground to form a ramp for running the gun up on the vehicle; said carriers having their free ends adapted to be swung to a position in which they engage the wheel-axle of the gun to secure the gun in position on the vehicle and means for locking the free ends of the carriers to the frame when they engage the axle.

7. In a vehicle for portable guns, the combination of the vehicle frame having a track for the carriage-wheels of the gun, and carriers extending in continuation of said track and swingingly connected at one end to the frame; said carriers having their other end adapted to rest on the ground to form a ramp for running the gun up on the track of the vehicle and a member connected with the vehicle for engaging the carriers to lock the gun on the vehicle.

8. In a vehicle for wheeled guns, the combination with the frame, of rails forming a track for the carriage-wheels of the gun, said rails having recesses in which the wheels are adapted to rest, and carriers extending in continuation of said track and swingingly connected at one end to the frame; said carriers having their other end adapted to rest on the ground to form a ramp for running the gun up on the track of the vehicle.

9. In a vehicle for wheeled guns, the combination with the frame of carriers having one end swingingly connected to the frame and having a free end adapted to rest on the ground to form a ramp for running the gun up on the vehicle; said carriers having their free ends adapted to be swung into a position in which they engage a part of the gun to secure the gun in position on the vehicle, means for locking the free ends of the carriers to the frame when they engage said gun-part, and claws on the frame adapted to engage over the press-plate of the gun-spade.

The foregoing specification signed at Dusseldorf, Germany, this 24th day of June, 1908.

MAX DREGER.

In presence of—
 PETER LIEBER,
 WILHELM FLASCHE.